J. B. VICTOR.
GASKET.
APPLICATION FILED APR. 15, 1918.
1,398,612.
Patented Nov. 29, 1921.
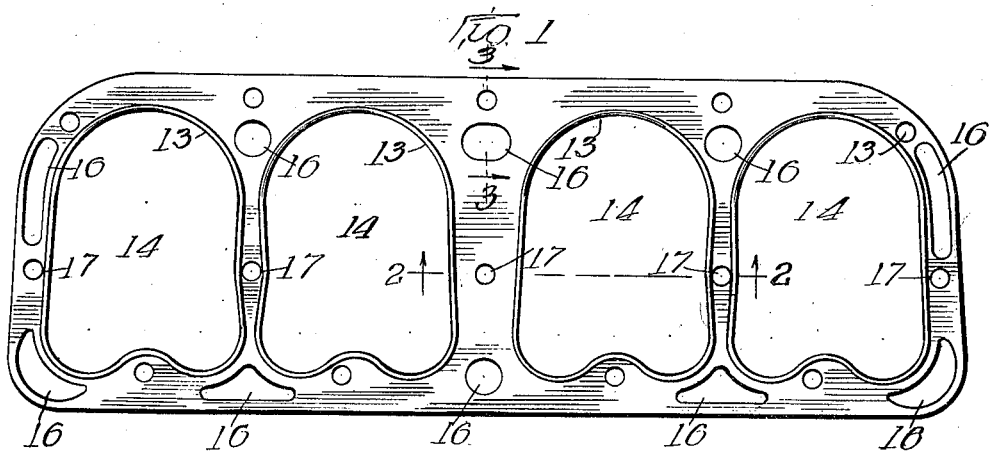
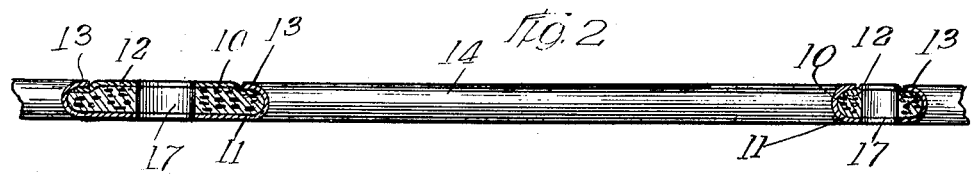
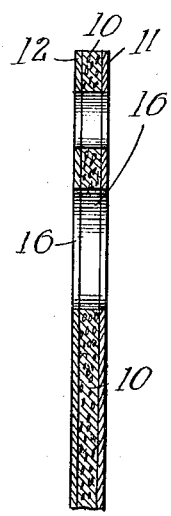
Witnesses:
Harry R. White
W. P. Kilroy
Inventor
Joseph B. Victor
By Barnett Numan Atty.

UNITED STATES PATENT OFFICE.

JOSEPH B. VICTOR, OF CHICAGO, ILLINOIS, ASSIGNOR TO VICTOR MANUFACTURING & GASKET CO., OF CHICAGO, ILLINOIS, A CORPORATION OF ILLINOIS.

GASKET.

1,398,612.   Specification of Letters Patent.   Patented Nov. 29, 1921.

Application filed April 15, 1918. Serial No. 228,612.

*To all whom it may concern:*

Be it known that I, JOSEPH B. VICTOR, a citizen of the United States, residing at Chicago, in the county of Cook and State of Illinois, have invented certain new and useful Improvements in Gaskets, of which the following is a specification.

My invention relates to the manufacture of gaskets, and particularly gaskets which are intended for use in sealing joints subject to considerable pressure, for example, the joints between the parts of an internal combustion motor such as the cylinder block and head in the type of motor having a head cast separately from the cylinder block.

The primary object of the invention is to provide a gasket for use in this, or other analogous situations, which will not be affected by heat or contact with water, oil, or gases, and which will be sufficiently resilient to accommodate itself to the parts between which it is used so as to make a reliably tight joint between these parts even when the area of contact of the parts with the gasket is considerable, and in case the surfaces, as may happen, are not perfectly smooth and even.

In the drawing annexed hereto I have shown a gasket of suitable shape for use between the cylinder block and removable head of a four cylinder internal combustion motor. So far as concerns my invention, the particular configuration of the gasket is a matter of no importance and the form and size of the gasket and the number of perforations which it has will, of course, depend upon the particular use for which it is intended. In the drawing, Figure 1 is a plan view of the gasket; and Figs. 2 and 3 are sectional views on lines 2—2 and 3—3, respectively, of Fig. 1, these views being on a considerably exaggerated scale.

The gasket comprises a filler sheet of compressible material 10 composed of comminuted cork and a suitable binder. This material is in common use for other purposes and is sold in sheets of various thickness. I prefer to use material one-sixteenth of an inch thick. The gasket comprises further two sheets of thin, resilient metal, preferably copper, these sheets being designated 11 and 12, and being arranged on opposite sides of the cork composition sheet 10. The sheet 11 is soft .010 gage copper, and sheet 12 is a harder copper, .005 of an inch thick. The three sheets are bound together by beading some of the edges of the gasket. A separate metal beading may be used for this purpose, but I prefer to form the beading by overlapping the edges of one of the sheets, sheet 11 for example, upon the other sheet 12 as shown at 13. All of the edges of the gasket may be beaded in this manner, but by employing the cork composition, it will ordinarily be necessary to bead only the edges of the larger openings 14 corresponding to the cylinder openings. The gasket at these places is subjected to high temperature which would burn the cork unless it were protected. Unless these edges were beaded, the gasket would not effectively hold the high pressures developed in the cylinders. The beading around openings 14 is indicated at 13. It will not ordinarily be necessary to bead or otherwise protect the water openings 16 or bolt holes 17, since the cork composition used in this gasket will not absorb water to any extent, as is the case with the materials heretofore used in making gaskets of this general type. This results in a considerable saving in cost of manufacture. The cork composition is quite tough so that in most instances it will not be necessary to bead the outer edges 18 of the gasket. A further saving is thus made in manufacturing cost, besides which the gasket is more flexible and compressible.

A gasket formed in this manner will be extremely resilient and compressible, so that it will make a reliable and tight joint between the joined parts even when, as in the case of the joint between the cylinder block and cylinder head of a gas engine, the surfaces of contact between the joined parts and the gasket are of considerable area in the aggregate, and not always perfectly even. When the gasket is subjected to pressure by the parts between which it is interposed, it will accommodate itself to slight inequalities in the opposed surfaces. Even when most of the edges of the gasket are unbeaded, the articles may be shipped or handled without injury to the filling sheet which, as stated, has considerable tensile strength.

I claim:

1. A gasket for use between the cylinder block and head of a gas engine having water spaces comprising two sheets of thin copper of relatively large area and a flat, thin filler sheet comprised of cork and a binder interposed between said copper sheets and having its edges exposed at the water openings.

2. A gasket for use in a joint subject to heat comprising a sheet of resilient material composed of comminuted cork and a binder having its opposite sides faced with sheets of resilient metal of relatively large area and a metal beading for covering only the edges of the cork subjected to heat and for binding said sheets together in a unitary structure.

3. A gasket for use between the cylinder block and head of a gas engine having water spaces, comprising two sheets of thin metal, and a flat, thin filler sheet composed of cork and a binder interposed between said metal sheets, said gasket being formed with an opening corresponding to the cylinder opening and with water openings and bolt holes and a beading which incloses the edge of the filler sheet at the opening corresponding to the cylinder opening so as to prevent the edges of said filler from being burned and for binding said sheets together in a unitary structure, and the edges of the filler exposed at the water openings and bolt holes.

JOSEPH B. VICTOR.